(12) United States Patent
Johnson et al.

(10) Patent No.: US 6,870,562 B2
(45) Date of Patent: Mar. 22, 2005

(54) VIBRATION ISOLATION SYSTEM

(75) Inventors: Benjamin A. Johnson, Woodbury, MN (US); Paul C. Schubert, Marine Saint Croix, MN (US); Randy A. Bierwerth, Woodbury, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/376,129

(22) Filed: Feb. 28, 2003

(65) Prior Publication Data

US 2004/0169719 A1 Sep. 2, 2004

(51) Int. Cl.[7] ............................................... B41J 2/435
(52) U.S. Cl. ...................................... 347/262; 347/264
(58) Field of Search ................................ 347/218, 219, 347/262, 264, 263; 68/23.2; 226/90

(56) References Cited

U.S. PATENT DOCUMENTS

| 5,956,071 A | | 9/1999 | Mattila et al. | ............... 347/262 |
|---|---|---|---|---|
| 6,299,045 B1 | * | 10/2001 | Hebert et al. | ................. 226/90 |
| 6,622,530 B1 | * | 9/2003 | Sumer et al. | ................ 68/23.2 |

* cited by examiner

Primary Examiner—Hai Pham
(74) Attorney, Agent, or Firm—William F. Noval

(57) ABSTRACT

An isolation system comprising: a substantially rectangular stationary frame; an imaging assembly including a curved platen for supporting image media and an exposure assembly for imagewise exposing a supported image media to produce exposed image media, wherein the imaging assembly has a substantial rectangular footprint and is sized to fit within the stationary frame; and a cable and spring assembly for suspending the imaging assembly from the frame to substantially isolate the imaging assembly from sources of external vibration.

10 Claims, 6 Drawing Sheets

VIBRATION ISOLATION SYSTEM

FIELD OF THE INVENTION

This invention relates in general to laser imaging systems incorporating an internal drum scanner assembly and more particularly to an isolation system for isolating said internal drum scanner assembly from external vibration sources during the imaging process.

BACKGROUND OF THE INVENTION

Laser imaging systems are commonly used to produce photographic images from digital image data generated by magnetic resonance (MR), computed tomography (CT) or other types of medical image scanners. Systems of this type typically include a continuous tone laser imager for exposing the image on photosensitive film, a film processor for developing the film, and control subsystems for coordinating the operation of the laser imager and the film processor.

The digital image data is a sequence of digital image values representative of the scanned image. Image processing electronics within the control subsystem processes the image data values to generate a sequence of digital laser drive values (i.e., exposure values), which are input to a laser scanner. The laser scanner is responsive to the digital laser drive values for scanning across the photosensitive film in a raster pattern for exposing the image on the film.

The continuous-tone images used in the medical imaging field have very stringent image-quality requirements. A laser imager printing onto transparency film exposes an image in a raster format, the line spacing of which must be controlled to better than one micrometer. In addition, the image must be uniformly exposed such that the observer cannot notice any artifacts. In the case of medical imaging, the observers are professional image analysts (e.g., radiologists).

Film exposure systems are used to provide exposure of the image on photosensitive film. Known film exposure systems include a linear translation system and a laser or optical scanning system. The laser scanning system includes a laser scanner with unique optical configurations (i.e., lenses and mirrors) for exposure of the image onto the film. The linear translation system provides for movement of the laser scanning system in a direction perpendicular to the scanning direction, such that a full image may be scanned on a piece of photosensitive film.

In an internal drum type laser scanner assembly, a piece of film is positioned onto a film platen, wherein the film platen has a partial cylindrical or partial drum shape. The photosensitive film is positioned against the film platen. The laser or optical scanning system is positioned at the center of curvature of the photosensitive film for scanning a scan line across the photosensitive film surface. A linear translation system moves the laser or optical scanning system lengthwise along a longitudinal axis as defined by the center of curvature of the film to expose an entire image onto the film.

The film may be fed onto the film platen utilizing a film transport system which often incorporates a plurality of feed rollers. Once the piece of photosensitive film is fed onto the film platen, the film must be held tight against the curved surface of the film platen, and centered and aligned into a scanning position in order for an image to be correctly exposed onto the photosensitive film. Any skew of the film must also be removed. Often such methods and mechanisms for aligning and centering a piece of film on the internal surface of the film platen require multiple complex mechanical and electrical components and control systems.

U.S. Pat. No. 5,956,071, issued Sep. 21, 1999, inventors Mattila et al., discloses an assembly for positioning a film into a scanning position on a curved film platen in an internal drum scanner assembly. The film platen is defined by a first curved edge, a second curved edge, a film feed edge, and a film stop edge. The assembly comprises a first slider block assembly and a second slider block assembly which is spaced from the first slider block assembly a distance less than the width of the leading edge of the photosensitive film. A feed mechanism is positioned proximate the film feed edge, for feeding a piece of photosensitive film having a leading edge along the curved film platen. The leading edge of the film is fed from a location proximate the film feed edge towards the film stop edge.

When the photosensitive film is in the scanning position, the leading edge of the photosensitive film contacts the first slider assembly and the second slider assembly. The photosensitive film is tensioned against the curved film platen in alignment between the first slider assembly and the second slider assembly and the feed mechanism, thus removing any skew.

The laser scanning system and linear translation system must be protected from external vibration sources during the imaging process in order to minimize image degradation in the scanned film. Variation of placement of scan lines must be controlled very tightly to avoid banding artifacts. Vibration sources can effectively produce these same artifacts by exciting natural frequencies of the systems within the imaging assembly. More abrupt or short term sources, such as shock, can cause more visible artifacts at a given location on the scanned film. Therefore, to effectively manage the performance of the imaging assembly, vibration sources must be controlled. Prior designs to achieve isolation for internal drum scanning equipment typically uses commercially available vibration and shock mount made from various rubber-like materials. These components do not have low enough natural frequencies and also show significantly different values of natural frequency for the in-plane motion versus the normal direction. Air systems for achieving lower natural frequencies are typically cost prohibitive and sometimes undesirable in certain environments as leakage will disable the system.

There is thus a need for a vibration isolation system for a laser imaging system which is cost effective, which can control natural frequencies of the system in multiple directions, which has high performance, and which is reliable and minimally complex in design.

SUMMARY OF THE INVENTION

According to the present invention, there is provided a solution to the problems discussed above.

According to a feature of the present invention, there is provided an isolation system comprising: a substantially rectangular stationary frame; an imaging assembly including a curved platen for supporting image media and an exposure assembly for imagewise exposing a supported image media to produce exposed image media, wherein said imaging assembly has a substantially rectangular footprint and is sized to fit within said stationary frame; and a cable and spring assembly for suspending said imaging assembly from said frame to substantially isolate said imaging assembly from sources of external vibration.

ADVANTAGEOUS EFFECT OF THE INVENTION

The invention has the following advantages.

1. Can control the natural frequencies in multiple directions—cable lengths and spring compression values can be chosen to carefully control the natural frequency in one plane of motion with completely independent values in the normal direction.

2. Low cost/High performance—can obtain natural frequencies typical of complex air isolation systems with relatively inexpensive equipment like cables and springs.

3. Can tune damping parameters of systems—geometry and material of damping foam can be used to control the damping characteristics in the three axes of translation.

4. Better control of system position—typical commercial mounts require large loads for low natural frequencies which makes them more unstable. As the system must line up with other subsystems for the reliable transfer of film, controlling the position of the platen becomes important as opposed to something that is positioned on a soft, low durometer material. Rigid cables better define the system position allowing for more accurate alignment with other subsystems.

DETAILED DESCRIPTION OF THE INVENTION

Figure 1:
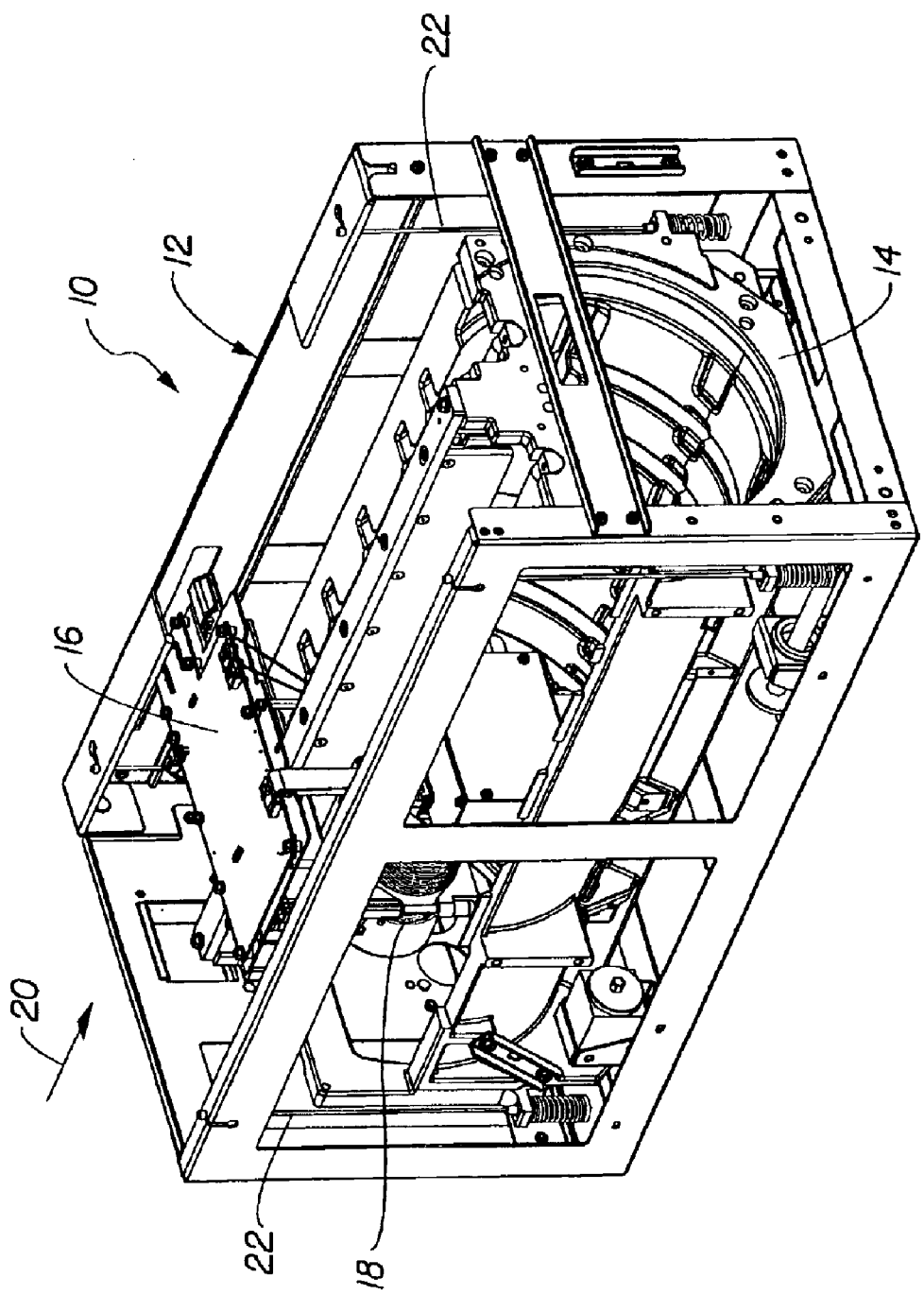
FIGS. 1 and 2 are isometric views of a laser imaging system incorporating the present invention.
Figure 2:
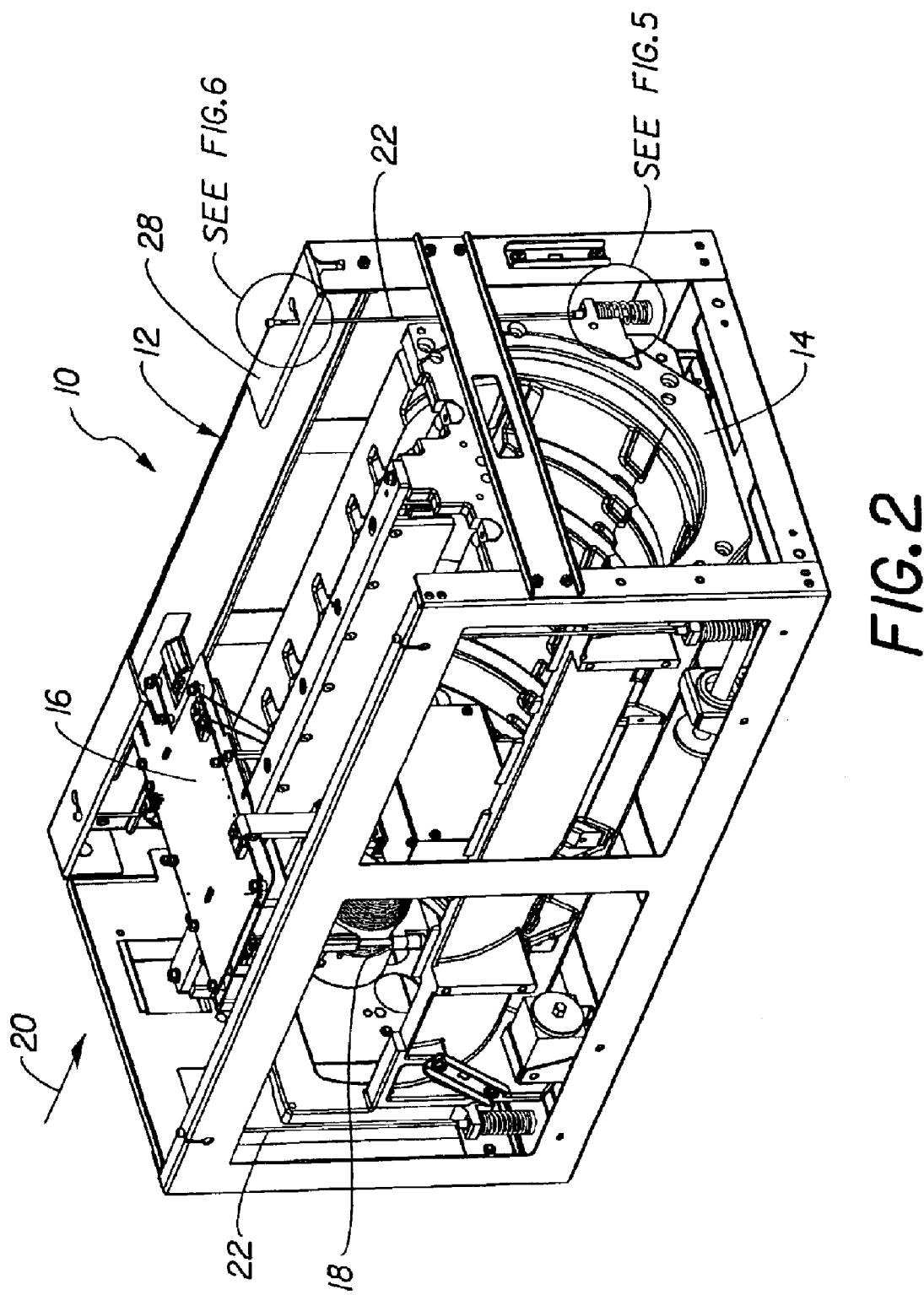

Referring now to FIGS. 1 and 2 there is shown a laser imaging system incorporating the present invention. As shown, laser imaging system 10 is a subsystem of a laser imager such as a laser imager for producing medical images on photothermographic film. In such a laser imager, a digital medical image is reproduced on heat developable photothermographic film fed onto a curved platen.

After exposure, the exposed film is brought into contact with a rotating heated drum which thermally develops the exposed film. The film is then cooled and output to a user for diagnostic applications.

Laser imaging system 10 includes a rectangular frame 12, an internal drum laser scanner assembly including concave, curved platen 14, translation assembly 16 and optics assembly 18. Optics assembly 18 is mounted by translation assembly 16 which is mounted on platen 14. Platen 14 and assemblies 16 and 18 are supported by cables 22 from frame 12. In operation, unexposed film is fed onto platen 14, and once properly positioned on platen 14, the film is exposed in a raster pattern by a rotating laser beam produced by optics assembly 18 which scans the film in consecutive lines as the optics assembly 18 is translated along the length of the film by translation assembly 16. Translation assembly 16 is moved in the direction of arrow 20.

Figure 6:
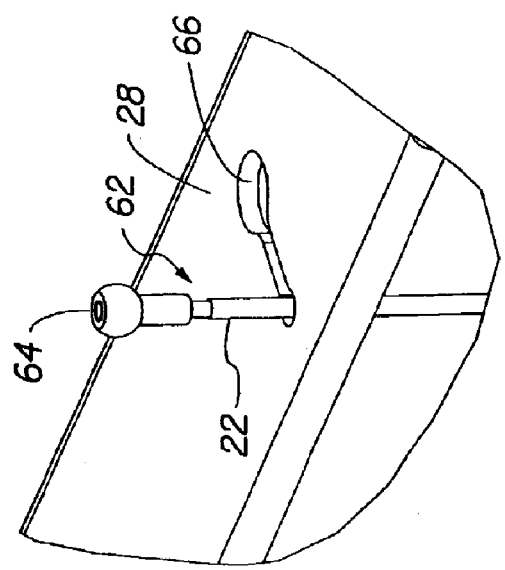
FIGS. 5 and 6 are exploded views of the cable connections to the platen and frame respectively.
Figure 5:
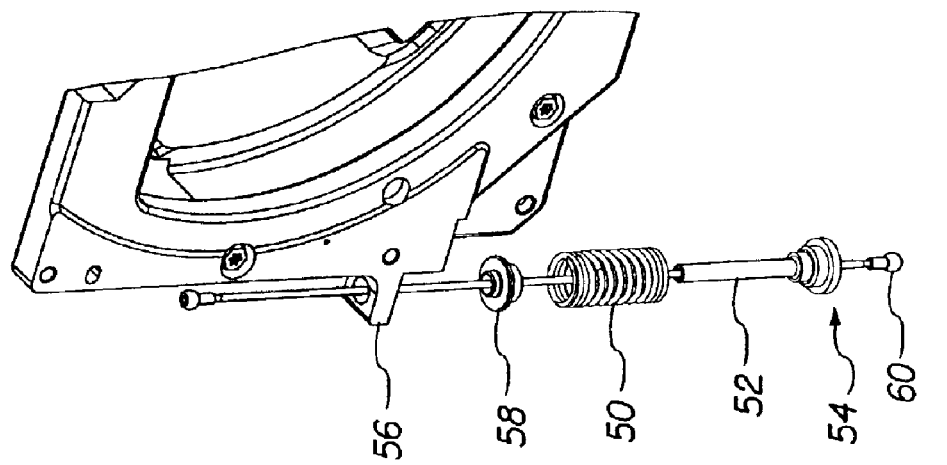

FIG. 2 shows the cable 22 connections to frame 12 as being presented in greater detail in FIGS. 5 and 6.

Figure 3:
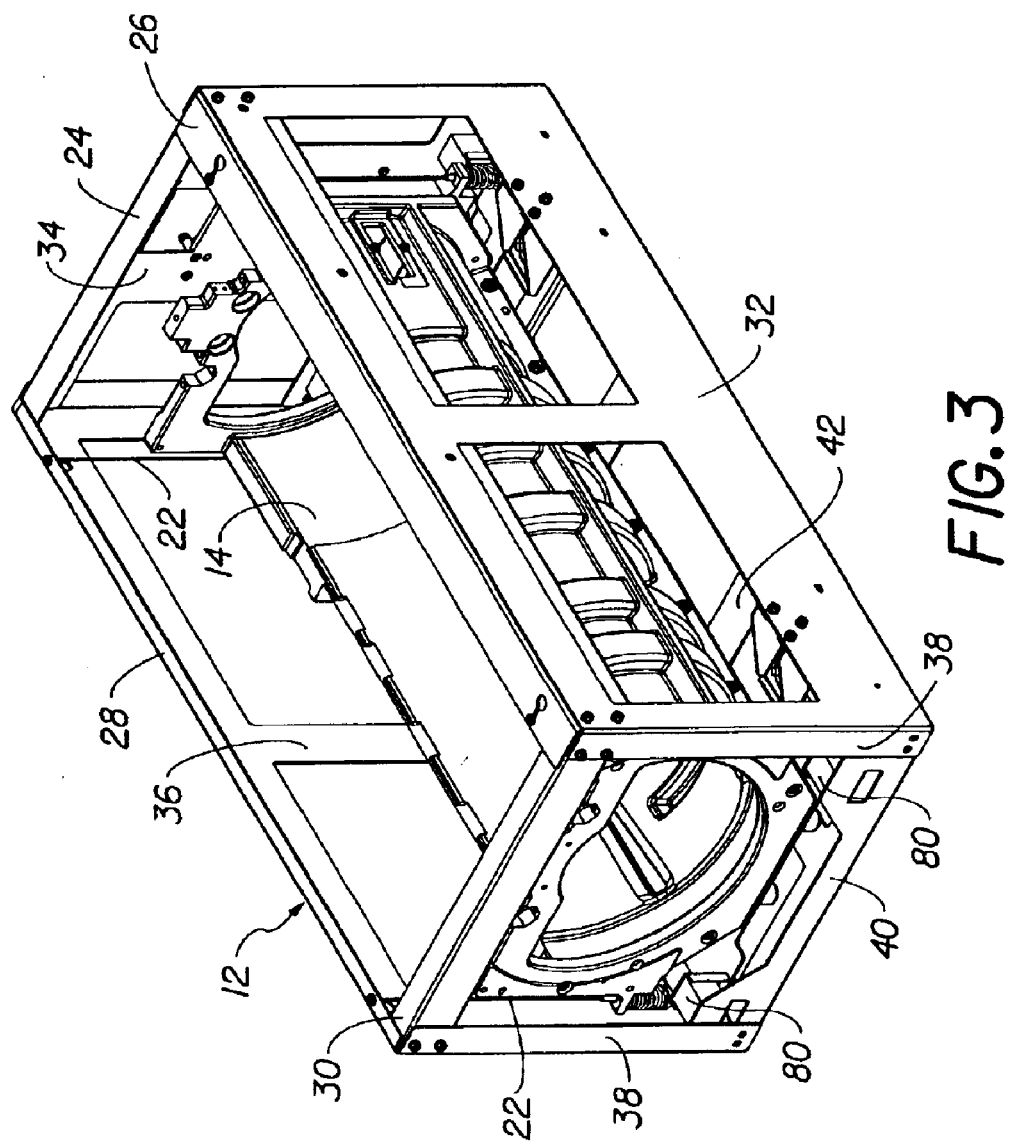
FIG. 3 is an isometric view showing certain of the components of the system of FIGS. 1 and 2.
Figure 4:
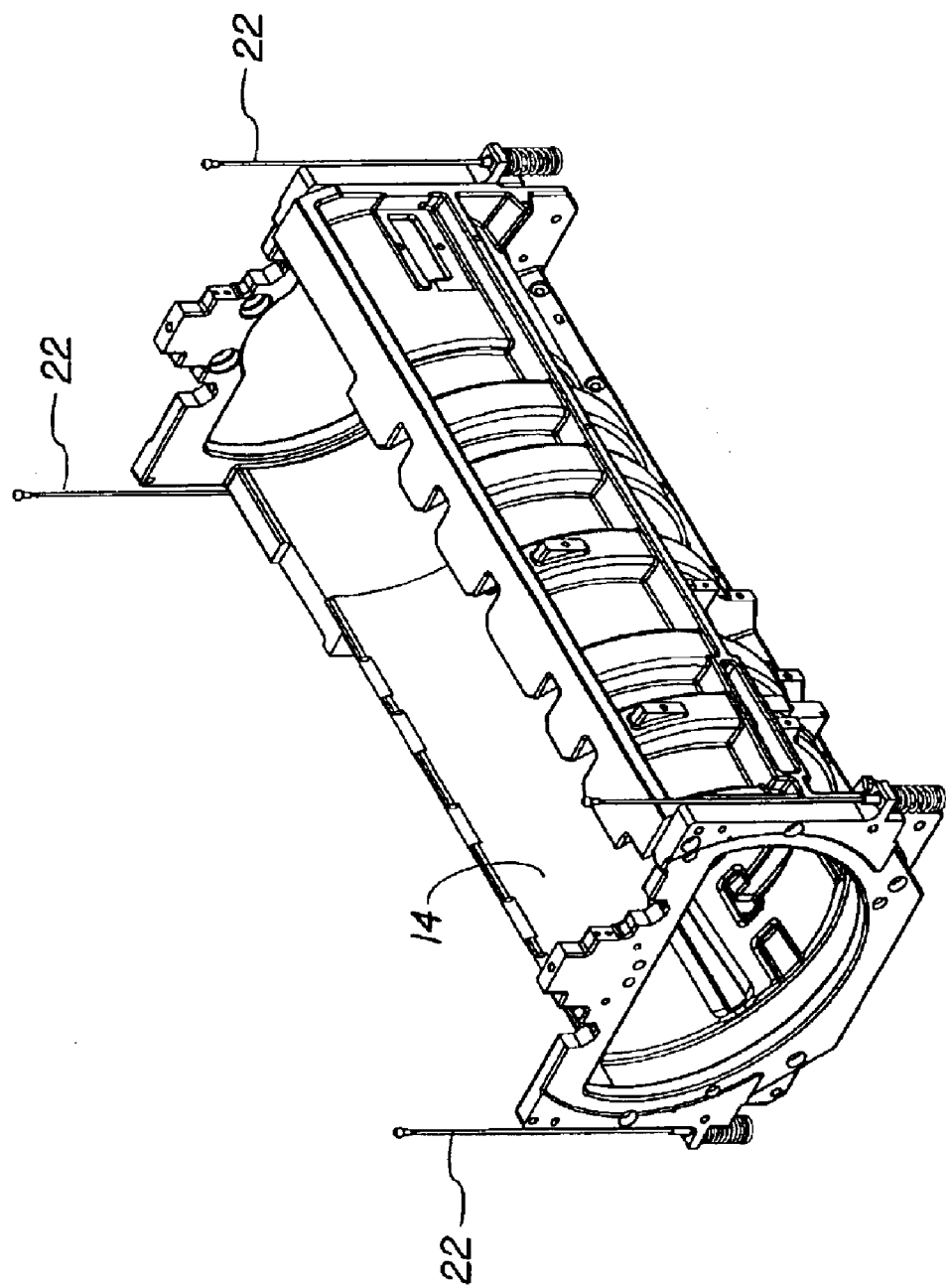
FIG. 4 is an isometric view of the cable suspension system and platen of the system of FIGS. 1 and 2.

FIG. 3 is an isometric view of the frame 12 and platen 14 without assemblies 16 and 18 to more clearly show the isolation system of the present invention. As shown, frame 12 is in the form of an open rectangular box-like configuration including upper members 24, 26, 28, 30, side members 32, 34, 36, 38 and bottom members 40, 42, (and others not shown). Platen 14 is suspended from frame 12 by cables 22. (See FIG. 4).

As shown more clearly in FIG. 5, each cable 22 is connected to platen 14 by a compression spring 50, coiled about support 52 on the bottom end 54 of cable 22. Platen tab 56, grommet 58 and cable button 60 complete the connection system. When platen 14 is supported, spring 50 is compressed between tab 56 and button 60 as a function of the compressibility of the spring and the weight of the platen and other assemblies supported by the individual cable 22.

As shown in FIG. 6, the upper end 62 of cable 22 is supported from a frame member, such as, member 28, by button 64 secured to the end of cable 22. Button 64 is threaded through keyhole 66 in member 28.

The purpose of the isolation system according to the present invention is to protect the imaging assembly from external vibration sources during the imaging process. Variation in the placement of the scan lines must be controlled very tightly to avoid banding artifacts. Vibration sources can effectively produce these same artifacts by exciting natural frequencies of the systems within the imaging assembly. More abrupt or short term sources, such as shock, can cause more visible artifacts at a given location on the film. Therefore to effectively manage the performance of the imaging assembly, vibration sources must be controlled. There are three options to controlling shock and vibration which include reducing the magnitude of the source, isolating either the source or the equipment where the response is measured, or by reducing the magnitude of the response. Numerous methods can be used to achieve these goals according to the invention there is used a combination of isolation along with alteration of the response frequencies. Isolating involves building a system between the source and the sensitive equipment to protect the system while the magnitude of the response is altered by adjusting the natural frequency of the system or various components. In particular this last methodology was used in the design of the platen 14 to stiffen the platen structure and drive its natural frequency as high as possible given the material and geometry constraints.

As described, the isolation system design according to the invention is composed of suspension cables 22 and springs 50 to isolate the assembly in the X, Y, and Z axes. The goal is to lower the natural frequency of the isolation system as much as possible so that the system will effectively be protected from frequencies above that level. Since frequencies up to the natural frequency of the system effectively transmit directly into it, the lower the system natural frequency the better because there are less low frequency sources available. For example driving the natural frequency down to a level of 1 Hz (typical of air suspension type systems) means that the system is isolated from frequencies above approximately 3 Hz. Since there are very few sources from which signals of 3 Hz and below are generated, the probability for success is high. On the other hand if the natural frequency of the system is designed to be 10 Hz, any sources from approximately 30 Hz and below can cause problems, therefore the system is susceptible to a much broader range of sources.

Figure 7:
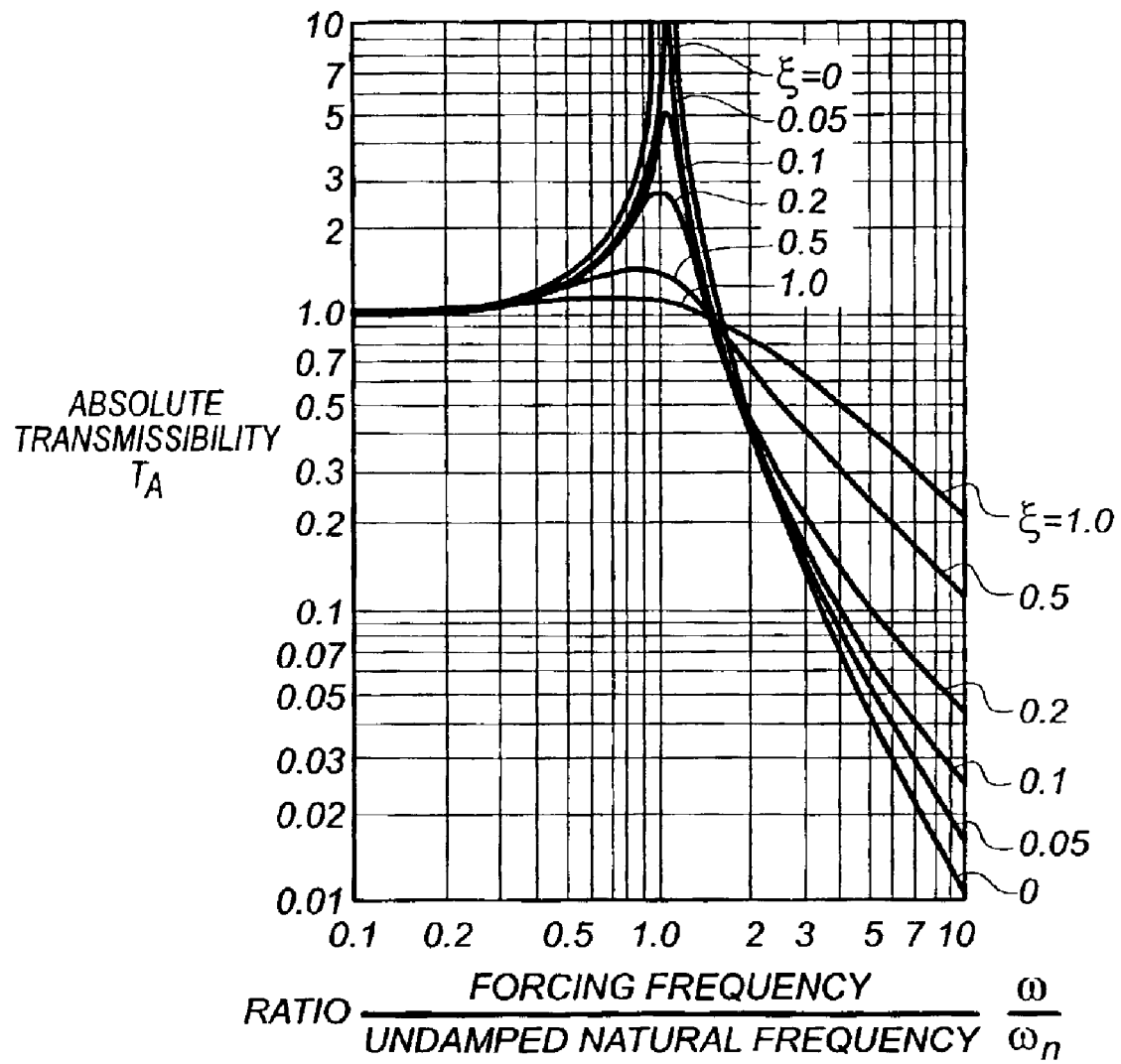
FIG. 7 is a graphical view of transmissability curves versus normalize forcing frequency.

From the absolute transmissibility curves FIG. 7, it is evident that significant attenuation of the input does not occur until approximately a factor of $3\omega_n$, where $\omega_n$ is the natural frequency of the isolation system. At that point the response magnitude is about one-tenth the level of the input. Of course, depending on the sensitivity of the systems involved, further attenuation levels may be required. Depending on the magnitude of the input, perhaps an attenuation level of one one-hundredth may be required based on the sensitivity of the system. In that case the natural frequency and damping characteristics would have to be adjusted to account for these magnitudes. In the case of the imaging assembly where even low magnitudes of vibration can present an artifact, image testing must be performed to ensure that the system is sufficiently protected. An alternate method would be to fully characterize the threshold magnitude of the imaging assembly at each frequency and evaluate that against the known input frequency and magnitudes. Given this information, the level of isolation could be calculated. This is a bit idealistic given the numerous input levels that would have to be quantified, therefore the target is to design an isolation system with as low a natural frequency as possible and verify the performance through testing. Potential external sources of shock or vibration during the imaging process can include the following: structure borne signals (either in buildings or mobile vans), inputs from air conditioners, fans, elevators, patient access doors opening and closing, hydraulic lifts, general workflow traffic levels, or from operators impacting the imager. Internal vibration sources include fans, electronic noise, and any mechanical sources from equipment operating during imaging like the pick-up assembly, the processor, and the sorter. Shipping is also a significant source of shock and vibration but it is handled separately (such as through lock-downs) as this is not a source while the machine is imaging.

For the in plane isolation, the cable suspension system essentially acts as a pendulum for which the natural frequency is defined by $$\omega_n = \sqrt{\frac{g}{l}}$$

where g is the acceleration of gravity and l is the length of the pendulum or in this case, the cable length. The effective pivot length for this design is approximately 225 mm, therefore $$\omega_n = \sqrt{\frac{9.806\left(\frac{m}{s^2}\right)}{0.255\ (m)}} = 6.60\frac{\text{rad}}{s}$$

or $$6.60\frac{\text{rad}}{s} * \frac{\text{cycle}}{2\pi(\text{rad})} = 1.0\frac{\text{cycles}}{s} = 1.0\ \text{Hz}$$

As there are different cable lengths used to balance the center of gravity of the imaging assembly, the shortest effective pivot length was used for this calculation to determine a conservative value for $\omega_n$. The balance of the imaging assembly is critical as the system must be positioned such that the feed rollers from the platen are square to the rollers leading to the vertical transport system. Therefore different cable lengths were selected such that this was achieved with the carriage at the front of the translation system as this is when the film exits the platen.

For the vertical direction, springs 50 are used to isolate the system. For a mass-spring system, the governing equation is $$\omega_n = \sqrt{\frac{k}{m}}$$

where k is the stiffness of the spring, and m is the mass it supports. Coupling the spring force equation, $$k = \frac{F}{\Delta x}$$

with the common mass-acceleration-force equation, F=ma, a relationship for the natural frequency of the system as a function of the spring displacement can be derived as follows:

$$\omega_n = \sqrt{\frac{k}{m}} = \sqrt{\frac{F/\Delta x}{m}} = \sqrt{\frac{ma/\Delta x}{m}} = \sqrt{\frac{a}{\Delta x}} = \sqrt{\frac{g}{\Delta x}}$$

Thus the natural frequency of the system is primarily dependent on the amount of spring deflection. The deflection for the springs 50 used in the present invention is slightly different due to an uneven weight distribution within the imaging assembly. Since the left side is much heavier due to the location of stepper motors and all the transport equipment, the springs on the left-hand side are compressed more than those on the right-hand side. In order for the platen to sit level, the cables on the left-hand side are actually shorter than those on the right-hand side.

As an example, assume the weight of the imaging assembly is 82 lbs. with approximately a 5.75 lbs. difference between the left-hand side and the right hand side. The commercial springs used for this application have a free length of 2.25 inches, and a spring rate of 24.24 lbs./in. for the stainless steel material (P/N 7e8491). The nominal deflection of all four springs is:

$$\Delta_{spring} = \frac{\left(\frac{W_{imaging}}{4}\right)}{k_{spring}} = \frac{\left(\frac{82\ \text{lbs}}{4}\right)}{24.24\ \frac{\text{lbs}}{\text{in}}} = 0.846\ \text{in} = 21.5\ \text{mm}$$

where 4 is the total number of springs supporting the weight of the imaging assembly. To balance off the 5.75 lbs. side-to-side difference, the following difference in cable lengths is used:

$$\Delta_{cable} = \frac{\textit{offsetweight}}{k_{spring}} = \frac{5.75\ \text{lbs}}{24.24\ \frac{\text{lbs}}{\text{in}}} = 0.237\ \text{in} = 6\ \text{mm}$$

Therefore the cables on the left-hand side are shortened from nominal by 3 mm while the cables on the right-hand side are lengthened by 3 mm. The actual spring deflections are then calculated as:

$$\Delta_{springleft} = \Delta_{springnominal} + \Delta_{springoffset} = 21.5\ \text{mm} + 3\ \text{mm} = 24.5\ \text{mm}$$

$$\Delta_{springright} = \Delta_{springnominal} - \Delta_{springoffset} = 21.5\ \text{mm} - 3\ \text{mm} = 18.5\ \text{mm}$$

Note that implicit to these calculations of spring deflection is the fact that the imaging assembly will remain level when placed into the machine. The assembly must be robust enough to operate within ±1° however as this is the levelness specification called out in the PRS. In terms of limiting the travel, the over-travel grommets will also account for this variability.

Knowing the spring deflection is the smallest on the right-hand side one can calculate the natural frequency in the vertical direction to give us the most conservative estimate. The deflection at that location is approximately 18.5 mm so the natural frequency is:

$$\omega_n = \sqrt{\frac{g}{\Delta x}} = \sqrt{\frac{9.806 \left(\frac{m}{s^2}\right)}{0.0185\ m}} = 23.02 \frac{\text{rad}}{s} = 3.7\ \text{Hz}$$

Again this is the natural frequency of the isolation system in the vertical direction. If it should be proven that this level is not sufficient under simulated vibration conditions, the natural frequency must be driven lower by choosing springs that deflect further than 18.5 mm. Note that to drive the natural frequency down to a level of either 2 Hz or even 1 Hz, a spring deflection of approximately 2.5 inches and nearly 10 inches would be required, respectively.

As shown from the transmissibility curves in FIG. 7, the roll-off or decay of the curve after the natural frequency greatly depends on the amount of damping $\xi$ in the system. With zero damping the absolute transmissibility reaches extreme magnitudes at the natural frequency, but the roll-off after that point is very steep. In contrast a system that is critically damped can be held under more control at resonance but has a very flat roll-off curve after that point. Therefore there is a trade off between how much motion can be withstood at resonance and what level of isolation is required beyond that point.

As shown in FIG. 3, a foam material 80 with certain damping properties is used to impart a low level of damping to the system. The goal is to minimize the impact of damping on the system (in order to maintain a steep roll-off curve) but still damp out oscillations of the imaging assembly within one or two cycles. Dampers 80 are placed in the front and back of the isolation system between frame 12 and platen 14 to achieve the desired effect. The axial direction of the assembly is the most important as that is the same direction as the translation system and can cause the carriage and optics module to rock. The same thing can be done in the vertical direction if required, but again this direction is not as critical. To vary the level of damping $\xi$, the geometry of the foam dampers 80 are varied and the system can in effect be tuned to a specific level. Optimal levels of damping must be determined under various levels of external vibration while making images to quantify the results. Preliminary testing was done to determine that four dampers (two in the front, two in the back) of approx. 1 in.$^2$ under 25% compression are required to effectively damp out external vibration sources. The invention has been described in detail with particular reference to certain preferred embodiments thereof, but it will be understood that variations and modifications can be effected within the spirit and scope of the invention.

PARTS LIST

10 laser imaging system
12 rectangular frame
14 curved platen
16 optics assembly
18 translation assembly
20 direction arrow
22 cables
23,26,28,30 upper members
32,34,36,38 side members
40,42 bottom members
50 compression spring
52 support
54 bottom end
56 platen tab
58 grommet
60 button
62 upper end
64 button
66 keyhole

What is claimed is:

1. An isolation system comprising:

a substantially rectangular stationary frame;

an imaging assembly including a curved platen for supporting image media and an exposure assembly for imagewise exposing a supported image media to produce exposed image media, wherein said imaging assembly has a substantial rectangular footprint and is sized to fit within said stationary frame; and a cable and spring assembly for suspending said imaging assembly from said frame to substantially isolate said imaging assembly from sources of external vibration;

wherein said imaging assembly has a natural frequency of vibration and said cable and sprint assembly has a natural frequency of vibration less than said natural frequency of vibration of said imaging assembly.

2. The system of claim 1 wherein said cable and spring assembly includes first, second, third and fourth cables extending from the corners of said imaging assembly to the corners of said stationary frame.

3. The system of claim 2 wherein said cable and spring assembly includes compression springs mounted between the lower ends of said cables and said imaging assembly.

4. The system of claim 3 wherein said imaging assembly has first and second sides and is heavier on said first side than on said second side and wherein said supporting cables on said first side are of different lengths than the cables supporting said second side to compensate for the difference in compression of said compression springs on said first side relative to said second side.

5. The system of claim 1 including a plurality of resilient foam dampers interposed between said frame and said imaging assembly to dampen vibration from external sources.

6. The system of claim 5 wherein said resilient foam is interposed between at least one of the sides or the bottoms of said frame and said imaging assembly.

7. The system of claim 1 wherein said exposure assembly includes an optics assembly for exposing a line of image information on image media and a translation assembly which supports said optics assembly and which is mounted for translation along the length of said platen to raster scan said image media in a direction normal to said line scan.

8. The system of claim 1 wherein said optics assembly includes a rotating laser beam to produce said line scan of image information.

9. An isolation system comprising:

a substantially rectangular stationary frame;

an imaging assembly including a curved platen for supporting image media and an exposure assembly for imagewise exposing a supported image media to produce exposed image media, wherein said imaging assembly has a substantial rectangular footprint and is sized to fit within said stationary frame; and a cable and spring assembly for suspending said imaging assembly from said frame to substantially isolate said imaging assembly from sources of external vibration;

wherein said cable and spring assembly includes first, second, third and, fourth cables extending from the corners of said imaging assembly to the corners of said stationary frame; and wherein said cable and spring assembly includes compression springs mounted between the lower ends of said cables and said imaging assembly.

10. The system of claim 9 including a plurality of resilient foam dampers interposed between said frame and said imaging assembly to dampen vibration from external sources.

* * * * *